US006487168B1

(12) United States Patent
Hamami (10) Patent No.: US 6,487,168 B1
(45) Date of Patent: Nov. 26, 2002

(54) STATIC SWITCHED VIRTUAL CIRCUITS IN A CONNECTION ORIENTED NETWORK

(75) Inventor: Ilan Hamami, Tel Aviv (IL)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/322,130

(22) Filed: May 27, 1999

(51) Int. Cl.$^7$ .......................... G01R 31/08; H04L 12/56
(52) U.S. Cl. ...................... 370/216; 370/409; 709/228; 710/103
(58) Field of Search .................... 370/216, 225, 370/242, 409, 395.1, 395.2, 395.3, 395.31, 392, 397, 389, 399–400; 709/203, 224, 228; 710/103

(56) References Cited

U.S. PATENT DOCUMENTS

| | | | |
|---|---|---|---|
| 5,483,536 A | 1/1996 | Gunji et al. | 370/85.14 |
| 5,550,818 A | 8/1996 | Brackett et al. | 370/60 |
| 5,566,014 A | 10/1996 | Glance | 359/124 |
| 5,894,471 A * | 4/1999 | Miyagi et al. | 370/230 |
| 6,147,965 A * | 11/2000 | Burns et al. | 370/216 |
| 6,272,107 B1 * | 8/2001 | Rochberger et al. | 370/216 |
| 6,304,549 B1 * | 10/2001 | Srinivasan et al. | 370/230 |
| 6,373,853 B1 * | 4/2002 | Yoshida | 370/465 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/te13997.html, 2 pages, Feb. 2, 1997.

* cited by examiner

*Primary Examiner*—Alpus H. Hsu
*Assistant Examiner*—Duc Ho
(74) *Attorney, Agent, or Firm*—Howard Zaretsky (57) ABSTRACT

A system for establishing static SVCs (i.e. permanent SVCs) whereby the results of the signaling/routing protocol generated when the network is first brought up are stored in a 'permanent SVC' memory. The results of the signaling/protocol that were previously stored are restored from memory in the event the connections must be re-established again. The connections are restored from memory without the need to execute the signaling/routing algorithms and protocols again. Use of the signaling/routing protocols yields the same connections that were already stored previously in the memory from when the connections were originally established. The system of the present invention is applicable to any connection-oriented network that utilizes signaling to establish connections between network users. The signaling and routing algorithms and protocols would not need to be run for every connection request. Rather, the parameters are retrieved from permanent SVC memory and configured into the switch saving considerable amounts of time.

16 Claims, 4 Drawing Sheets

STATIC SWITCHED VIRTUAL CIRCUITS IN A CONNECTION ORIENTED NETWORK

FIELD OF THE INVENTION

The present invention relates generally to data communications networks and more particularly relates to a system for establishing static/permanent Switched Virtual Circuits (SVCs) in a connection oriented network such as an Asynchronous Transfer Mode (ATM) network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

SVC Traffic Analysis

Networks that are connection oriented typically have two stages for connecting network users from point to point. The first stage in the establishment of the connection utilizes some form of signaling mechanism and in the second stage, data is transferred via the connection established in the first stage.

An example of such as connection oriented network is an ATM network. In the first stage, virtual connections are created using a complicated signaling/routing protocol such as Q.SAAL, Q.93, IISP, and/or PNNI between peer network nodes along the connection path to provide network users a service for establishing a connection to another network user. This connection is termed a Switched Virtual Connection (SVC) and, once created, is used as the data path between the users that have been connected.

The connection originator uses the signaling protocol to convey the service details it is requesting the network to provide, e.g., destination address (i.e. the called address), calls of service, traffic descriptor, protocol which is to be used by the virtual connection, network transit, etc. In addition, the originator provides information about itself, in particular, its own address (i.e. the calling address).

Once the network receives the request from the originator user, it attempts to find a route to the destination that has sufficient resources to fulfill the specific characteristic requirements of the request as provided by the originating user. If the network finds a satisfactory route with the necessary resources to establish the connection, and if the called user also has sufficient resources to establish the connection, the connection is then established. Once the route is established, data can flow between source and destination over the connection.

Such a network may carry another type of connection known as a Permanent Virtual Circuit (PVC) which is typically established under manual management control. The service provided by PVCs and SVCs are the same, with the difference being their method of establishment.

The signaling/routing protocol used typically consumes a high percentage of computation resources in a node. This makes the connection establishment process slow. PVCs, as an alternative to SVCs are set via management in a manual fashion on each network node along the path. The PVC connections are typically stored in the system memory within the nodes making up the connection and are re-established in the event one or more portions of the connection fail. The connections are re-established and restored automatically, quickly and without the overhead of the signaling and routing protocol.

In the course of network operations, SVCs may be constantly created and torn down. SVC connections may be created very quickly and last for a relatively short lifetime duration, i.e., hundreds of milliseconds, seconds, etc., before being removed. In many networks today, however, SVCs serve to connect well known services located in the network to well known clients also connected to the network. These connections are utilized as permanent connections, as they are established and may not be taken down for days, weeks, and months. In many cases, SVCs are established on a permanent basis, whereby they are never taken down and remain up until a network failure occurs.

For example, in LAN Emulation (LANE) and MPOA protocols, which are client/server based protocols, all clients must connect to the server and, once connected, can connect to each other. The connection to the server, however, is permanent, i.e., it is made once and never taken down for reasons other than a network failure, notwithstanding the fact that it was established as an SVC and not a PVC. If these client/server connections go down, they all must be re-established before clients can communicate with each other.

In many instances, it is necessary to rebuild and re-establish network SVC connections from scratch. Such instances include but are not limited to (1) when the topology of a network changes, (2) when a portion of a network is disconnected and connected again, (3) when clients are disconnected and connected again, or (4) when servers are disconnected and connected again. The re-establishment of these connections may involve hundreds, thousands and even tens of thousands or more connections, depending on he size and topology of the network. In most cases, it involves a very large number of connections to recreate, thus consuming a large amount of resources and a long time to complete. The entire reconnection process may consume from a few minutes or many tens of minutes even for very fast networks. Typically, the bottleneck is the signaling protocol between the switches, while the routing algorithm and associated protocol consumes somewhat fewer resources than the signaling. The hardware configuration of the switching fabric within the switch is the least time consuming and occurs relatively quickly since it is mostly a hardware operation.

It would therefore be desirable to have a connection mechanism that could be utilized by a network to create static SVCs, i.e., permanent SVCs, that would be recreated automatically by the nodes along the path in the event the SVC goes down as during a link or node failure.

SUMMARY OF THE INVENTION

The present invention is a system for establishing static SVCs, i.e., permanent SVCs whereby the results of the signaling/routing protocol created when the network is first brought up are stored in a 'permanent SVC' memory. The results of the signaling/protocol that were previously stored are restored from memory in the event the connections must be recreated again. The connections are restored from memory without the need to utilize the signaling/routing algorithms and protocols again. The use of the signaling/routing protocols would, in any event, yield the same results, i.e., connections, which were already stored previously in the memory from when the connections were originally established. Note that the overhead of re-establishment is as if the connections were PVCs, which results in very quick connection restoration times. The system of the present invention is applicable to any connection-oriented network that utilizes signaling to establish connections between network users.

Eliminating the requirement of executing the signaling/routing algorithms and protocols, the static SVC system of the present invention can save as much as 80% of the time that is normally required to establish SVC connections. The signaling and routing algorithms and protocols would not need to be run for every connection request. Rather, the parameters are retrieved from permanent SVC memory and configured into the switch saving considerable amounts of time.

There is provided in accordance with the present invention, in a connection oriented network, a method of establishing static Switched Virtual Circuits (SVCs) originated from an SVC originator, the method comprising the steps of generating, on the SVC originator, a specific information element directing a next switch along the connection route to create a static SVC, transmitting the specific information element, along with a connection request message to the next switch along the connection route, performing, on the next switch, signaling/routing algorithm and protocol functions so as to yield a set of connection results, storing the set of connection results in a permanent SVC memory in the switch, forwarding the connection request message including the specific information element to the next switch along the connection path and re-establishing a static SVC connection from the permanent SVC memory without the use of the signaling/routing algorithm and protocol in the event the static SVC goes down.

The step of generating comprises the step of generating a permanent SVC reference number associated with a VPI/VCI pair, the permanent SVC reference number included in the specific information element.

The step of storing comprises the step of generating an entry in a table comprising a first permanent SVC reference number, VPI/VCI at the calling port, VPI/VCI at the called port, called port number, next hop called port permanent SVC reference number and one or more hardware parameters, the table maintained per calling port. The SVC originator comprises one or more applications programmed a priori to create one or more SVCs as static SVCs. The step of instructing comprises the step of communicating via an AtoM MIB using the SNMP protocol from the network management station to the switch.

The method further comprises a network management station adapted to instruct the SVC originator or a switch to delete a specific static SVC from the permanent SVC memory thereof. The method further comprises a network management station adapted to instruct the SVC originator or a switch to ignore a specific static SVC previously stored in the permanent SVC memory upon the re-establishment of the specific SVC. The method further comprises a network management station adapted to instruct the SVC originator or a switch to refresh the permanent SVC memory by re-establishing a connection utilizing the signaling/routing algorithm and protocol and storing a set of updated results in the permanent SVC memory.

There is also provided in accordance with the present invention, in a connection oriented network, a method of establishing static Switched Virtual Circuits (SVCs) for an SVC already established by an SVC originator, the method comprising the steps of selecting, by a network manager via a network management station, one or more SVCs to make permanent, instructing, by the network manager via the network management station, each switch along the connection route to make one or more SVCs permanent, storing the set of signaling/routing algorithm and protocol connection results generated previously in a permanent SVC memory and re-establishing a static SVC connection from the permanent SVC memory without the use of the signaling/routing algorithm and protocol in the event the static SVC goes down.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|------|-----------|
| ANSI | American National Standards Institute |
| ATM | Asynchronous Transfer Mode |
| CCITT | Comite Consulatif International Telegraphique et Telephonique |
| CoS | Class of Service |
| EEPROM | Electrically Erasable Programmable Read Only Memory |
| FDDI | Fiber Distributed Data Interface |
| IE | Information Element |
| IISP | Interim Inter-Switcb Signaling Protocol |
| ITU | International Telecommunications Union |
| LANE | LAN Emulation |
| LEC | LAN Emulation Client |
| MIB | Management Information Base |
| MPOA | Multiprotocol Over ATM |
| NV | Non Volatile |
| NVRAM | Non Volatile Random Access Memory |
| PNNI | Private Network to Network Interface |
| PVC | Permanent Virtual Circuit |
| SAAL | Signaling ATM Adaptation Layer |
| SNMP | Simple Network Management Protocol |
| SVC | Switched Virtual Circuit |
| UNI | User to Network Interface |
| VCI | Virtual Channel Identifier |
| VPI | Virtual Path Identifier |

General Description

The present invention is a system for establishing static SVCs, i.e., permanent SVCs whereby the results of the signaling/routing protocol created when the network is first brought up are stored in a 'permanent SVC' memory. The results of the signaling/protocol that were previously stored are restored from memory in the event the connections must be recreated again. The connections are restored from memory without the need to utilize the signaling/routing algorithms and protocols again. The use of the signaling/routing protocols would, in any event, yield the same results, i.e., connections, which were already stored previously in the memory from when the connections were originally established. Note that the overhead of re-establishment is as if the connections were PVCs, which results in very quick connection restoration times. The system of the present invention is applicable to any connection-oriented network that utilizes signaling to establish connections between network users.

Note that the system of the present invention is applicable to any connection-oriented network that utilizes signaling to establish connections between network users. For illustration purposes, the static SVCs establishment system of the present invention is described within the context of an ATM network. The scope of the present invention, however, is not intended to be limited to the example ATM network presented herein.

Figure 1:
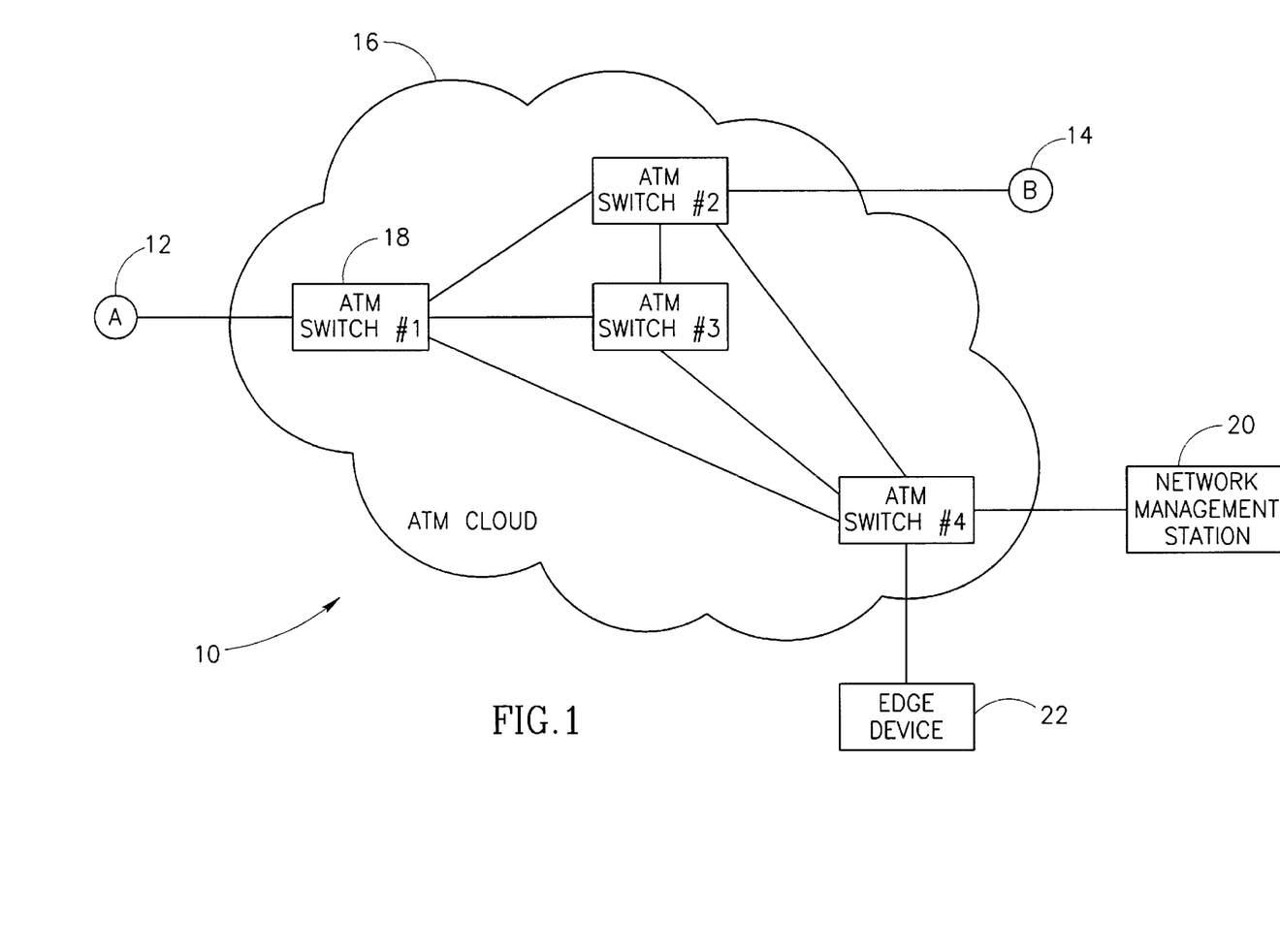
FIG. 1 is a block diagram illustrating an ATM network including a plurality of switches, an SVC originator, a destination and a network management station configured to establish one or more static SVCs in accordance with the present invention.

A block diagram illustrating an ATM network including a plurality of switches, an SVC originator, a destination and a network management station configured to establish one or more static SVCs in accordance with the present invention is shown in FIG. 1. The network, generally referenced 10, comprises an SVC originator 12, destination 14, several switches 18, labeled switch #1 through switch #4, edge device 22, ATM network 16 and network management station 20.

The SVC originator can be any network device that is capable of establishing SVCs, and may include, for example, an ATM end station, Ethernet based edge device, LEC, MPOA Client, etc. The SVC originator is operative to create one or more SVCs to the destination via any of the switched #1 through #4. The network management station comprises control means, adapted in accordance with the present invention, operative to establish a static SVC and/or convert an already existing SVC that was previously established normally to a static SVC. The network management station is effective to establish a static SVC. Normally, the network manager would have knowledge of the network and of the route an SVC takes. With this knowledge one or more switches are chosen in which to establish the static SVC.

The selection of which SVC connections to make 'permanent' or 'static' can be decided either by the client or by the network manager. In practice, either the client (via automatic means) or the network manager (via manual means) defines on a selective basis which SVC connections are to be made static. In addition, the selection or designation of an SVC as static can be made automatically by the SVC originator. An application in the SVC originator, i.e., edge device, LEC, MPOA client, or any other client of the call connection service, can determine which, if any, SVCs established are to be static SVCs.

Figure 2:
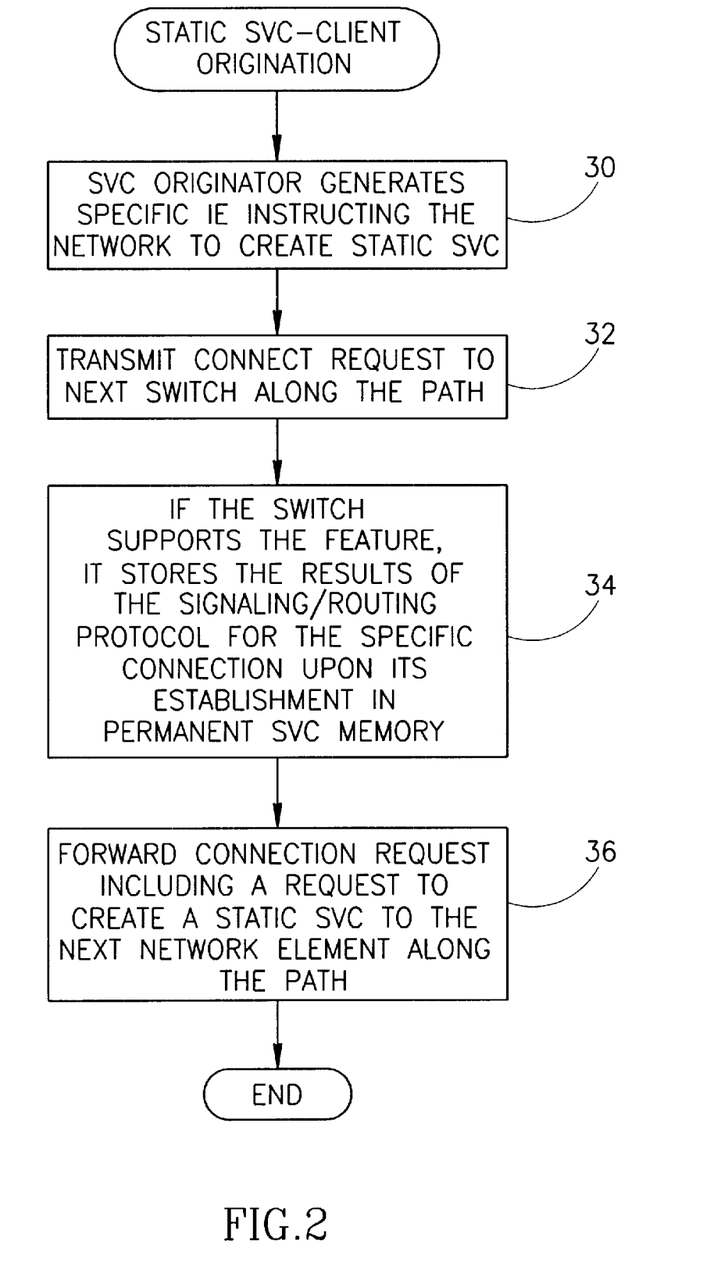
FIG. 2 is a flow diagram illustrating the static SVC client origination portion of the present invention.

The method of establishing a static SVC via the client will now be described in more detail. A flow diagram illustrating the static SVC client origination portion of the present invention is shown in FIG. 2. The client establishes a static SVC utilizing the signaling protocol itself. The signaling protocol is adapted to comprise a special Information Element (IE) which tells the network to store the results of the signaling/routing algorithm and protocol for a specific connection. The SVC originator generates this specific IE which serves to instruct the network to create the static SVC (step 30).

The SVC originator then transmits the connection request to the next switch in the path (step 32). The connection request received includes the specific IE instructing the switch to make the associated SVC static. If the switch supports the feature of the present invention, the specific IE causes the switch to store the results of the signaling/routing algorithm and protocol for the associated connection upon its establishment in a 'permanent SVC' memory (step 34).

The switch then forwards the connection request including the IE requesting to create a static SVC to the next network element along the path (step 36). Note that the next network element may comprise a switch, node, destination or client. The method then repeats for that network element. If the network element supports the feature, it stores the results of the signaling/routing algorithm and protocol in its permanent SVC memory. If a network element does not support the feature, it cannot store the results of the signaling/routing protocol but does forward the request to the next switch along the path.

As result of the above method, if at a later time the connection needs to be restored for whatever reason, the SVC originator, i.e., client, will not need to re-establish the connection again because the network will re-establish the connection automatically without any intervention by the SVC originator. The same route will be established and the same VPI/VCIs and Class of Service (CoS) will be assigned throughout the path. The network restores the route initially established by retrieving from the permanent SVC memory the results of the signaling/routing algorithm/protocol.

The SVC originator is configured to store connection information concerning the SVC in its memory so that the SVC can be restored at a later time in the event of a failure. The data required to be stored by the SVC originator in its permanent SVC memory is presented below in Table 1.

TABLE 1

Permanent SVC Information Stored in SVC Originator

| Reference No. | VPI/VCI |
|---|---|
| 1 | |
| 2 | |
| * | |
| * | |
| * | |
| N | |

Note that a separate table is created per application and per connection manager on each SVC originator. The table is stored in the permanent SVC memory of the SVC originator.

Each entry in the table comprises a reference number and a VPI/VCI. The reference A number is a number used to identify a permanent SVC. It is generated by the SVC originator and used as an index into the table for lookup purposes. The scope of the reference number is link by link and not global. The VPI/VCI is the VPI/VCI from the last establishment and is sufficient to completely identify the connection. The permanent SVC reference number generated by the SVC originator, i.e., the client, is included in the setup request message that is sent to the next switch along the path.

One or more tables are also created at each of the network switches along the path that support the feature of the present invention. The tables are stored in the permanent SVC memory within the switch. The connection information stored in the permanent SVC memory is used by the switch at a later time to restore one or more static SVCs at a later time in the event of a failure. The data required to be stored by the switch in its permanent SVC memory is presented below in Table 2.

TABLE 2

Permanent SVC Information Stored in Network Switches

| Ref. No. | VPI/VCI at Calling Port | VPI/VCI at Called Port | Called Port Number | (Next Hop) Called Port Permanent SVC Reference No. | Hardware Dependent Parameter(s) |
|---|---|---|---|---|---|
| 1 | | | | | |
| 2 | | | | | |
| * | | | | | |
| * | | | | | |
| * | | | | | |
| N | | | | | |

Note that a separate table is created per calling port on each switch along the connection path.

Each entry in the table comprises a reference number, the VPI/VCI of the calling port, the VPI/VCI of the called port, the called port number, the called port permanent SVC reference number of the next hop and one or more hardware dependent parameters. The reference number is a number used to identify a permanent SVC. It is generated by the previous network element in the path, i.e., the element corresponding to the received setup message (for example, either the SVC originator or another switch). The permanent SVC reference number is used as an index into the table for lookup purposes. The scope of the permanent SVC reference number is link by link and not global.

The next field comprises the VPI/VCI at the calling port, followed by the VPI/VCI at the called port and the called port number. Together these information fields identify a connection across a link from port to port. The next hop called port permanent SVC reference number is generated by the switch and used to identify the specific SVC on this and the next switch. The next hop called port permanent SVC reference number generated by the switch is included in the setup request message that is sent to the next switch along the path.

Thus, each switch along the path functions to generate a new permanent SVC reference number. The reference number is used to distinguish static SVCs from each other.

The last field comprises one or more hardware parameters. This field is implementation specific and may vary from switch to switch. For example, it may comprise a priority parameter, a Class of Service (CoS) parameter, etc.

In the event of a recovery from a failure, the switches along the route re-establish the static SVC connections in accordance with the data in Table 2 that was stored previously in the permanent SVC memory.

The information elements transmitted by the client (SVC originator) and the switches comprises any and all data that is also stored in the two tables presented above. The IE sent along with the setup request message instructs the next switch along the routing path to create the requested SVC as a static SVC. The permanent SVC reference number, among other data, is included in the IE.

In operation, the client can be configured to understand the nature of the connections that are requested to be established. Knowing the reason for the connection, the client can be configured to know when to designate a particular connection a permanent SVC connection. Once an SVC is designated and created as a static SVC, it can be re-established without performing the time consuming signaling/routing algorithm and protocol. The nature of the connections established by the client can be configured via programming by the network management station or other suitable means.

Figure 3:
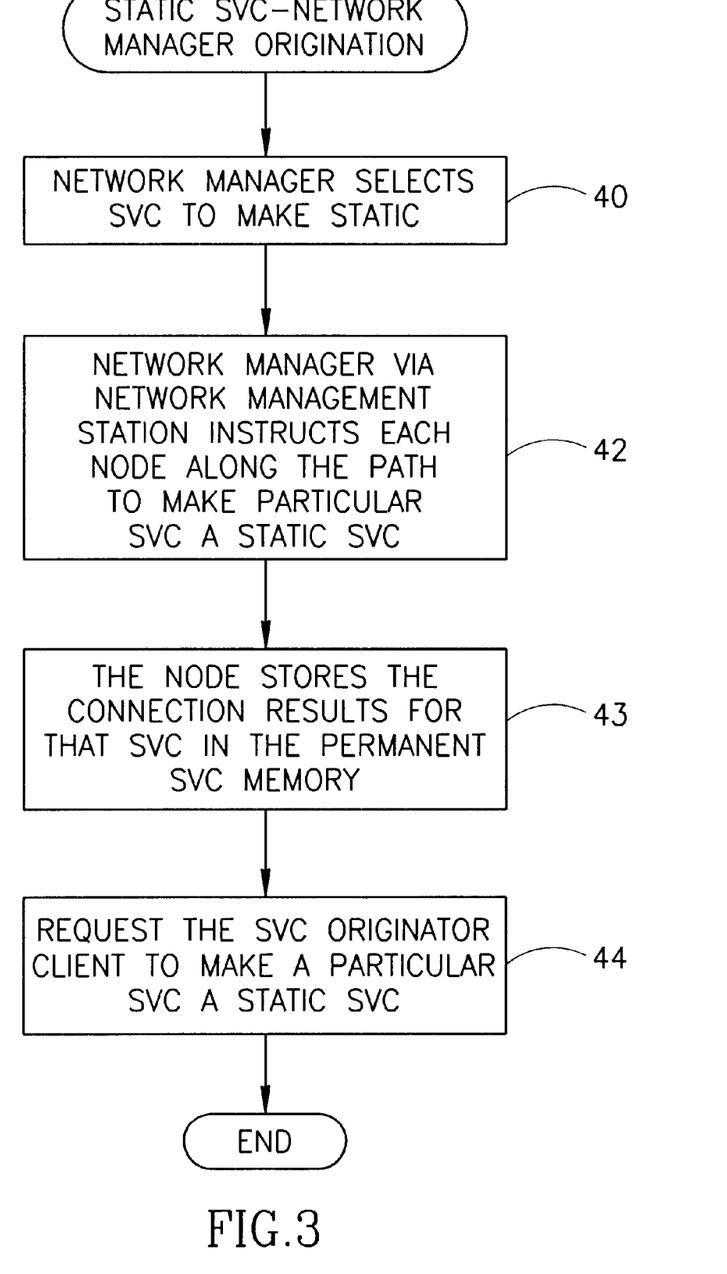
FIG. 3 is a flow diagram illustrating the static SVC network manager origination portion of the present invention.

A flow diagram illustrating the static SVC network manager origination portion of the present invention is shown in FIG. 3. As described previously, the network manager, in addition to the client, may create a static SVC. In this case, the network manager, via the network management station 20 (FIG. 1), selects an SVC to be made static (permanent) (step 40). Once the SVC is selected, the network manager, via the network management station, instructs each node along the path to make a particular SVC a permanent SVC (step 42).

The network management station utilizes the ATM Forum standard AtoM MIB of each network element along the routing path to select the desired SVC to be made permanent. The MIB functions as a request to the particular switch to consider the selected SVC a permanent SVC.

In response, the switch that receives the request to make an SVC static, stores the signaling/routing algorithm and protocol results generated previously for the requested SVC in the permanent SVC memory (step 43). The resulting entry in the table is the same as if the request arrived with an original connection request message.

In addition to all the switches along the path, the SVC originator is requested by the network manager, via the same means of the ATM Forum AtoM MIB mentioned above, to make a particular SVC a permanent SVC (step 44). Requesting the client to make a SVC a permanent SVC, obviates the need for the client to request establishment of a particular SVC again upon re-establishment. Thus, the network manager must request that an SVC be made a static SVC on the SVC originator, both end stations, both end nodes and all nodes along the connection path.

Figure 4:
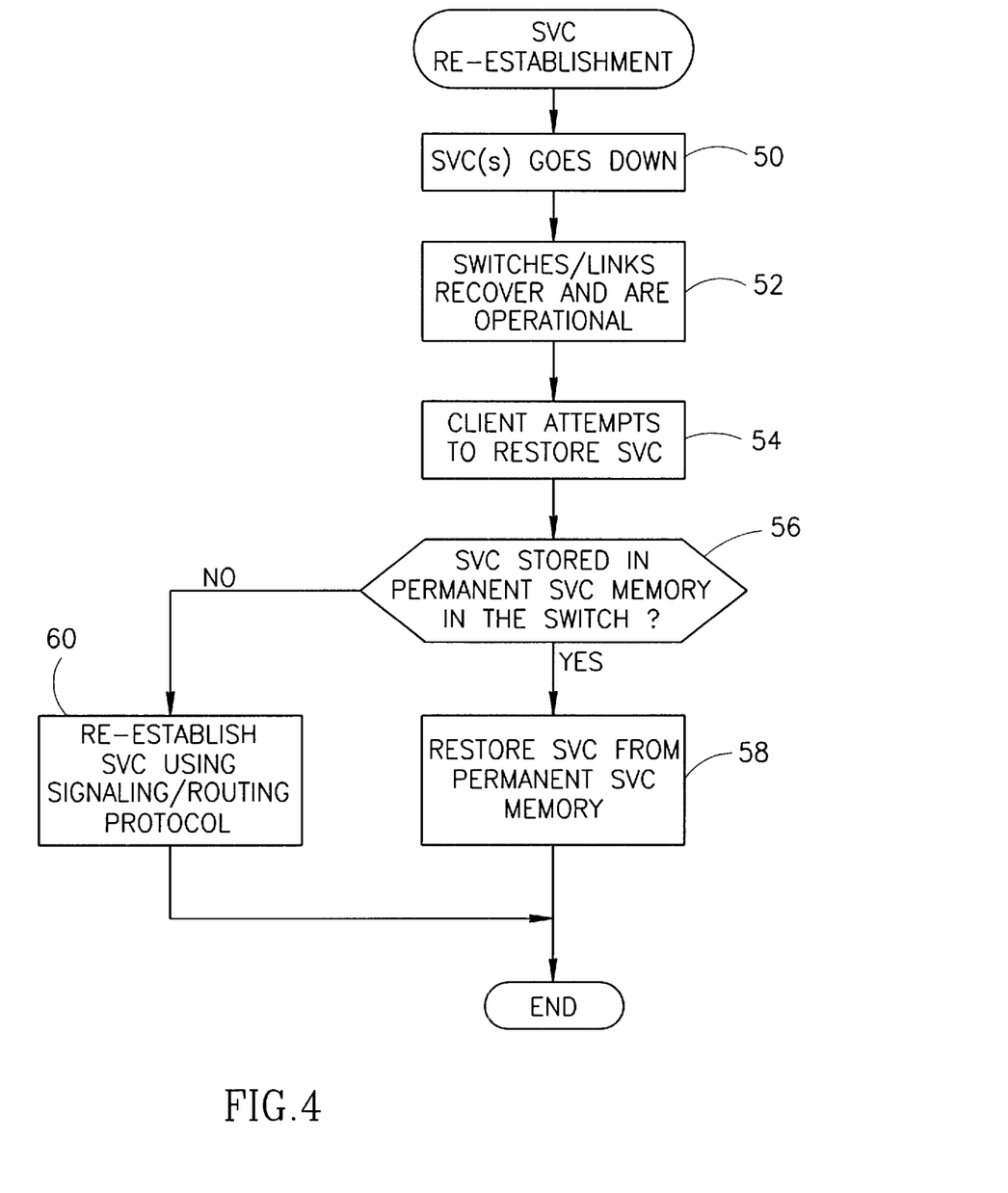
FIG. 4 is a flow diagram illustrating the SVC re-establishment portion of the present invention.

A flow diagram illustrating the SVC re-establishment portion of the present invention is shown in FIG. 4. In both cases, i.e., client requested static SVC and network manager requested static SVC, the client can attempt to re-establish the SVC again. If the SVC was previously designated a static SVC, the SVC is established from the parameters stored previously in the permanent SVC memory. Typically, the network manager can obtain the topology view of a network by using the AtoM MIB via the SNMP protocol. The network manager can also view all the connections opened by a switch, including all SVCs and PVCs. Once the network topology is obtained, one or more selected SVCs can be made permanent by instructing the switch to store the corresponding call connection parameters in its permanent SVC memory. The end result achieved is the same as would be achieved had the static SVC request been received in the setup request message from the client, i.e., the SVC originator.

Referring to FIG. 4, assume one or more SVCs fail, including SVCs that were established as static SVCs, due to for example, a link failure, node failure, etc. (step 50). After the failure is restored, i.e., the links or nodes are again operational (step 52), the client (the SVC originator) attempts to re-establish the SVCs that existed before the failure (step 54). The switch comprises means of knowing when a failure or a power up has occurred due to, for example, a link failure or switch power cycling. The SVC originator can attempt to re-establish the connections as they were since it was the originator of the SVCs to begin with.

Each switch along the path decides whether to restore the connection from permanent SVC memory or to re-establish the connection using the signaling/routing algorithm/ protocol. In accordance with the invention, the restore feature can be enabled and disabled on the client, each switch and/or on an edge device according to a command given by the network management station or other management entity.

The switch determines whether the connection parameters were previously stored in its permanent SVC memory (step 56). If so, the SVC is restored using the parameters previously stored in the permanent SVC memory (step 58). If the connection request does not correspond to a static SVC or no entry is found in the permanent SVC memory, the SVC is re-established using the normal signaling/routing algorithm and protocol (step 60).

The permanent SVC memory in each embodiment may comprise any suitable non volatile (NV) memory such as Non Volatile Random Access Memory (NVRAM), Electrically Erasable Programmable Read Only Memory (EEPROM), FLASH memory, hard disk storage, etc. Note that in the event of a memory failure, connectivity is not lost. When a connection request arrives for an SVC created previously as a static SVC, and the permanent SVC memory fails, the call parameters cannot be retrieved and the connection cannot be restored from memory. In this case, the connection is re-established using the normal signaling/ routing algorithm and protocol.

In both embodiments, i.e., the client requested static SVC and network manager requested SVC, the client can specifically request the following to be performed: (1) to delete or erase the permanent SVC memory for a particular SVC, (2) to ignore the memory for a particular SVC, and (3) to refresh the memory concerning a specific SVC.

The permanent SVC memory in a switch or client can be deleted (erased) for a specific SVC. In addition, a switch can be instructed to ignore the entry in the permanent SVC memory for a particular SVC. The entry is present in the memory but it is ignored for the specific SVC when a call connection requests the re-establishment of a static SVC. Also, the memory can be refreshed by re-establishing the connection again using the signaling/routing algorithm and protocol and placing the results of the calculations. The updated results are stored in the memory, thus refreshing it.

Note that the above features can be selectively turned on and off for a specific SVC. In addition, the features can be conveyed from the network management station to the one or more switches and client utilizing the same signaling protocol IE that is used to establish static SVCs.

While the invention has been described with respect to a limited number of embodiments, it will be appreciated that many variations, modifications and other applications of the invention may be made.

What is claimed is:

1. In a connection oriented network, a method of establishing static Switched Virtual Circuits (SVCs) originated from an SVC originator, said method comprising the steps of:

generating, on said SVC originator, a specific information element directing a next switch along the connection route to create a static SVC;

transmitting said specific information element, along with a connection request message to the next switch along the connection route;

performing, on the next switch, signaling/routing algorithm and protocol functions so as to yield a set of connection results;

storing said set of connection results in a permanent SVC memory in said switch;

forwarding said connection request message including said specific information element to the next switch along said connection path; and re-establishing a static SVC connection from said permanent SVC memory without the use of said signaling/ routing algorithm and protocol in the event of a static SVC failure.

2. The method according to claim 1, wherein said step of generating comprises the step of generating a permanent SVC reference number associated with a VPI/VCI pair, said permanent SVC reference number included in said specific information element.

3. The method according to claim 1, wherein said permanent SVC memory comprises nonvolatile memory.

4. The method according to claim 1, wherein said step of storing comprises the step of generating an entry in a table comprising a first permanent SVC reference number, VPI/ VCI at the calling port, VPI/VCI at the called port, called port number, next hop called port permanent SVC reference number and one or more hardware parameters, said table maintained per calling port.

5. The method according to claim 1, wherein said SVC originator comprises one or more applications programmed a priori to create one or more SVCs as static SVCs.

6. The method according to claim 1, wherein said step of instructing comprises the step of communicating via an ATM forum standard AtoM MIB using the SNMP protocol from said network management station to said switch.

7. The method according to claim 1, further comprising a network management station adapted to instruct said SVC originator or a switch to delete a specific static SVC from the permanent SVC memory thereof.

8. The method according to claim 1, further comprising a network management station adapted to instruct said SVC originator or a switch to ignore a specific static SVC previously stored in said permanent SVC memory upon the re-establishment of said specific SVC.

9. The method according to claim 1, further comprising a network management station adapted to instruct said SVC originator or a switch to refresh said permanent SVC memory by re-establishing a connection utilizing said signaling/routing algorithm and protocol and storing a set of updated results in said permanent SVC memory.

10. In a connection oriented network, a method of establishing static Switched Virtual Circuits (SVCs) for an SVC already established by an SVC originator, said method comprising the steps of:

selecting, by a network manager via a network management station, one or more SVCs to make permanent;

instructing, by said network manager via said network management station, each switch along the connection route to make one or more SVCs permanent;

storing the set of signaling/routing algorithm and protocol connection results generated previously in a permanent SVC memory; and re-establishing a static SVC connection from said permanent SVC memory without the, use of said signaling/routing algorithm and protocol in the event of a static SVC failure.

11. The method according to claim 10, wherein said permanent SVC memory comprises nonvolatile memory.

12. The method according to claim 10, wherein said step of storing comprises the step of generating an entry in a table comprising a first permanent SVC reference number, VPI/VCI at the calling port, VPI/VCI at the called port, called port number, next hop called port permanent SVC reference number and one or more hardware parameters, said table maintained per calling port.

13. The method according to claim 10, wherein said step of instructing comprises the step of communicating via an ATM forum standard AtoM MIB using the SNMP protocol from said network management station to said switch.

14. The method according to claim 10, further comprising a network management station adapted to instruct said SVC originator or a switch to delete a specific static SVC from the permanent SVC memory of.

15. The method according to claim 10, further comprising a network management station adapted to instruct said SVC originator or a switch to ignore a specific static SVC previously stored in said permanent SVC memory upon the re-establishment of said specific SVC.

16. The method according to claim 10, further comprising a network management station adapted to instruct said SVC originator or a switch to refresh said permanent SVC memory by re-establishing a connection utilizing said signaling/routing algorithm and protocol and storing a set of updated results in said permanent SVC memory.

* * * * *